United States Patent
Holliday

(10) Patent No.: US 9,103,457 B2
(45) Date of Patent: Aug. 11, 2015

(54) ASSEMBLY HAVING A DUAL BARRIER GASKET

(75) Inventor: David G Holliday, Spring, TX (US)

(73) Assignee: Dril-Quip, Inc., Houston, TX (US)

( * ) Notice: Subject to any disclaimer, the term of this patent is extended or adjusted under 35 U.S.C. 154(b) by 491 days.

(21) Appl. No.: 13/168,615

(22) Filed: Jun. 24, 2011

(65) Prior Publication Data

US 2011/0316239 A1    Dec. 29, 2011

Related U.S. Application Data

(60) Provisional application No. 61/358,640, filed on Jun. 25, 2010.

(51) Int. Cl.
| | |
|---|---|
| *F16L 23/16* | (2006.01) |
| *F16L 23/18* | (2006.01) |
| *F16L 23/20* | (2006.01) |
| *F16J 15/00* | (2006.01) |
| *F16J 15/06* | (2006.01) |
| *F16J 15/08* | (2006.01) |
| *F16K 27/04* | (2006.01) |

(52) U.S. Cl.
CPC .............. *F16K 27/044* (2013.01); *F16J 15/002* (2013.01); *F16J 15/061* (2013.01); *F16J 15/062* (2013.01); *F16J 15/064* (2013.01); *F16J 15/08* (2013.01); *F16L 23/167* (2013.01); *F16L 23/18* (2013.01); *F16L 23/20* (2013.01)

(58) Field of Classification Search
CPC ......... F16J 15/06; F16J 15/061; F16J 15/062; F16J 15/08; F16L 23/167; F16L 23/18; F16L 23/20
USPC ........................... 277/608, 609, 616, 626, 643
See application file for complete search history.

(56) References Cited

U.S. PATENT DOCUMENTS

| | | | | |
|---|---|---|---|---|
| 3,141,685 | A | * | 7/1964 | Watts .............................. 285/93 |
| 5,039,140 | A | * | 8/1991 | Szymczak .................. 285/334.2 |
| 5,431,417 | A | * | 7/1995 | Dahlgren ...................... 277/614 |

(Continued)

FOREIGN PATENT DOCUMENTS

GB         2311795 A      8/1997

OTHER PUBLICATIONS

Product literature relating to Vector Duoseal Sealring available at http://www.vectortg.com/subsea-duoseal-sealring/.

(Continued)

*Primary Examiner* — Kristina Fulton
*Assistant Examiner* — Nicholas L Foster
(74) *Attorney, Agent, or Firm* — Baker Botts L.L.P.

(57) ABSTRACT

An assembly having a dual barrier gasket located at an interface between a first body and a second body is disclosed. The dual barrier gasket may include a substantially cylindrical inner surface. The dual barrier gasket may further include a gasket outer surface that is configured to provide an inner sealing barrier and an outer sealing barrier, where a first tangent plane to a portion of the outer sealing barrier is radially offset from a second tangent plane to a portion of the inner sealing barrier. The gasket outer surface may include a first port and a second port. A channel may extend from the first port through the dual barrier gasket to the second port. The first body (or the second body) include a channel extending from a cavity between the two sealing barriers of the dual barrier gasket and the first body (or the second body) to an external port.

12 Claims, 10 Drawing Sheets

(56) References Cited

U.S. PATENT DOCUMENTS

| | | | |
|---|---|---|---|
| 5,839,765 A * | 11/1998 | Carter et al. | 285/334.2 |
| 5,941,530 A * | 8/1999 | Williams | 277/322 |
| 6,007,111 A | 12/1999 | Wafer | |
| 6,409,176 B2 | 6/2002 | Allen | |
| 6,722,426 B2 | 4/2004 | Sweeney et al. | |
| 7,025,360 B2 * | 4/2006 | Walker et al. | 277/652 |
| 7,819,439 B2 * | 10/2010 | Paton et al. | 285/341 |
| 8,096,560 B2 * | 1/2012 | Pallini et al. | 277/607 |
| 8,226,089 B2 * | 7/2012 | Pallini et al. | 277/607 |
| 2004/0056432 A1 * | 3/2004 | Walker et al. | 277/627 |
| 2008/0048443 A1 * | 2/2008 | Paton et al. | 285/333 |
| 2009/0102132 A1 * | 4/2009 | Holliday | 277/324 |

OTHER PUBLICATIONS

Product literature relating to FMC Technologies Straight Bore Metal Seal (SBMS) available at http://www.fmctechnologies.com/en/SurfaceWellhead/Technologies/Seals/MetalSeals/SBMS.aspx.

* cited by examiner

ASSEMBLY HAVING A DUAL BARRIER GASKET

CROSS-REFERENCE TO RELATED APPLICATION

This application claims the benefit of U.S. Provisional Application No. 61/358,640, which was filed Jun. 25, 2010 and is hereby incorporated by reference in its entirety.

BACKGROUND

The present disclosure relates generally to gaskets and, more particularly, to dual barrier gaskets.

Gaskets are commonly used in a number of industries for sealing a variety of equipment, such as valves. In the production of oil and gas in the field, a number of valves are often used with a well tree at a well head to control fluid flow associated with the well. Another valve, such as a down-hole safety valve (DHSV), also known as a sub-surface safety valve (SSSV), is positioned down the well to provide closure under emergency conditions.

In subsea well applications, industry standards require at least two sealing barriers between the flow bore, which contains production fluid, and the exterior environment for openings located before the first wing valve of the subsea tree. This same requirement may also be imposed on surface equipment by customers. However, tree gate valve bonnet flanges and piping outlet flanges typically associated with well tree equipment are usually equipped with gaskets providing only a singly sealing barrier. In the past, to meet the two-barrier industry standard, some have considered the lower master valve at the well tree to be a second barrier, and the DHSV or SSSV has been considered to be the first barrier. But this design approach provides two sealing barriers only when the DHSV or SSSV is closed. When the DHSV or SSSV is open, the conventional gaskets of the well tree are the only barrier between the production fluid and the environment. Conventional gaskets only provide one barrier. In such conditions, that approach fails to meet the two-barrier standard and renders the well vulnerable to leakage and potentially disastrous events. Some have addressed this issue by adding a second outer gasket to the flange that encompasses a smaller inner gasket. This has the disadvantage that the larger, outer gasket will require a much large flange and flange retention means, such as bolting size or clamp size.

SUMMARY

The present disclosure relates generally to gaskets and, more particularly, to dual barrier gaskets that have four sealing surfaces that provide two independent and testable barriers when installed.

In one aspect, a dual barrier gasket is disclosed. The dual barrier gasket may include a substantially cylindrical inner surface. The dual barrier gasket may further include a gasket outer surface that is configured to provide an inner sealing barrier and an outer sealing barrier, where a first tangent plane to a portion of the outer sealing barrier is radially offset from a second tangent plane to a portion of the inner sealing barrier. The gasket outer surface may include a first port and a second port. A channel may extend from the first port through the dual barrier gasket to the second port.

In another aspect, a dual barrier gasket is disclosed where the dual barrier gasket may include a substantially cylindrical inner surface and a gasket outer surface that is generally opposite the substantially cylindrical inner surface and comprises a midpoint. The dual barrier gasket may further include a first longitudinal end abutting the substantially cylindrical inner surface and a second longitudinal end abutting the substantially cylindrical inner surface and generally opposite the first longitudinal end. The dual barrier gasket may further include a first sealing surface between the first longitudinal end and the midpoint and a second sealing surface between the first sealing surface and the midpoint, where a first tangent plane to a portion of the second sealing surface is radially offset from a second tangent plane to a portion of the first sealing surface.

In yet another aspect, an assembly configured to be sealed with a dual barrier gasket is disclosed. The assembly may include a first body, a second body, and a dual barrier gasket configured to seal an interface between the first body and the second body. The dual barrier gasket may include a substantially cylindrical inner surface and a gasket outer surface. The gasket outer surface may be configured to provide an inner sealing barrier and an outer sealing barrier, wherein a first tangent plane to a portion of the outer sealing barrier is radially offset from a second tangent plane to a portion of the inner sealing barrier.

Accordingly, embodiments of the present disclosure may allow for two barriers in a number of applications where a dual barrier seal is required. With a well tree application, certain embodiments may allow for two barriers between a well bore and the outside environment when fluid is flowing in the well tree. Certain embodiments may allow for the conversion of existing equipment with a two-gasket implementation to a dual barrier gasket, while maintaining the existing bolting and valve body size. Additionally, embodiments may allow for a dual barrier gasket without significantly increasing the diameter of the outer sealing surface, thereby allowing the connection size and the required bolting size to be minimized due to the decreased load required to maintain the seals. These and other features and advantages of the present disclosure will be readily apparent to those skilled in the art. While numerous changes may be made by those skilled in the art, such changes are within the spirit of the invention.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to gaskets and, more particularly, to dual barrier gaskets.

Illustrative embodiments of the present disclosure are described in detail herein. In the interest of clarity, not all features of an actual implementation are described in this specification. It will of course be appreciated that in the development of any such actual embodiment, numerous implementation-specific decisions must be made to achieve developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

A gasket may be considered a short cylinder with a thin cross section that has the purpose of forming a seal between two mating components. A gasket may be placed in a "seating area" cooperatively provided by the two components. The "seating area" may have a very smooth surface finish and is slightly smaller in diameter than the mating surface of the conventional gasket. The seating area may have a slight taper, a straight bore, or combination of taper and straight bore. The two components may be drawn together by some means, such as tightening of bolting, until the components are at a desired position and the gasket is in the installed condition or state. With the components drawn together and sufficient forces applied, the gasket contacts the seating area and provides the sealing surfaces.

Figure 1A:
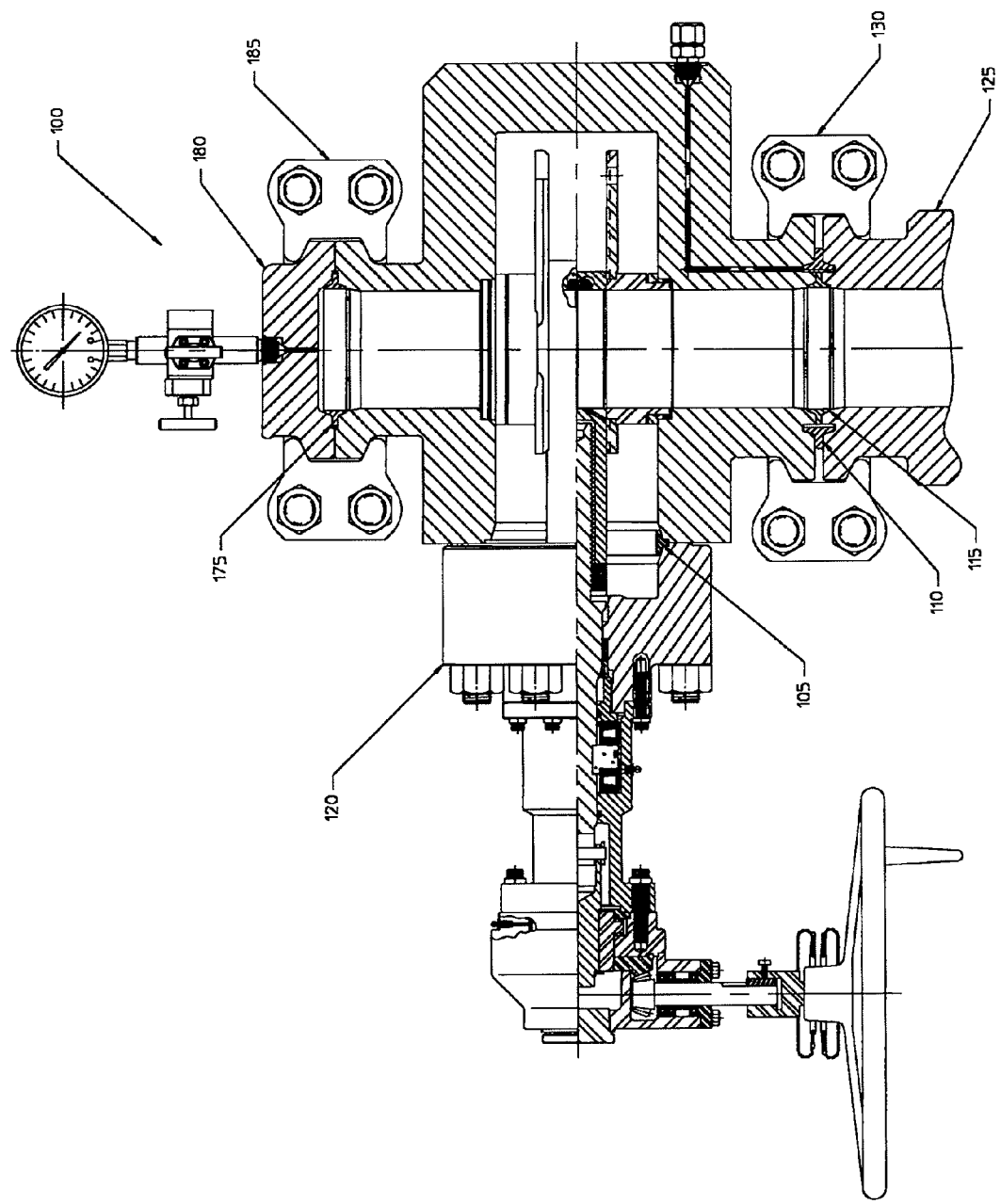
FIG. 1A is an overall cross sectional view of a gate valve with conventional gaskets at the bonnet flange and outlet flanges.

FIGS. 1A, 1B, 1C and 1D show a gate valve assembly 100 with conventional gaskets. FIG. 1A is an overall cross sectional view of the gate valve 100 with conventional gaskets generally indicated at 105, 110, 115 and 175. The gate valve assembly 100 includes a gate valve 120 that interfaces with an annular body 125. The gaskets 110 and 115 are located at the interface between the gate valve 120 and the annular body 125. A clamping arrangement 130 typically maintains the connection between the gate valve 120 and the annular body 125 by providing forces on the gate valve and annular body flanges.

Figure 1B:
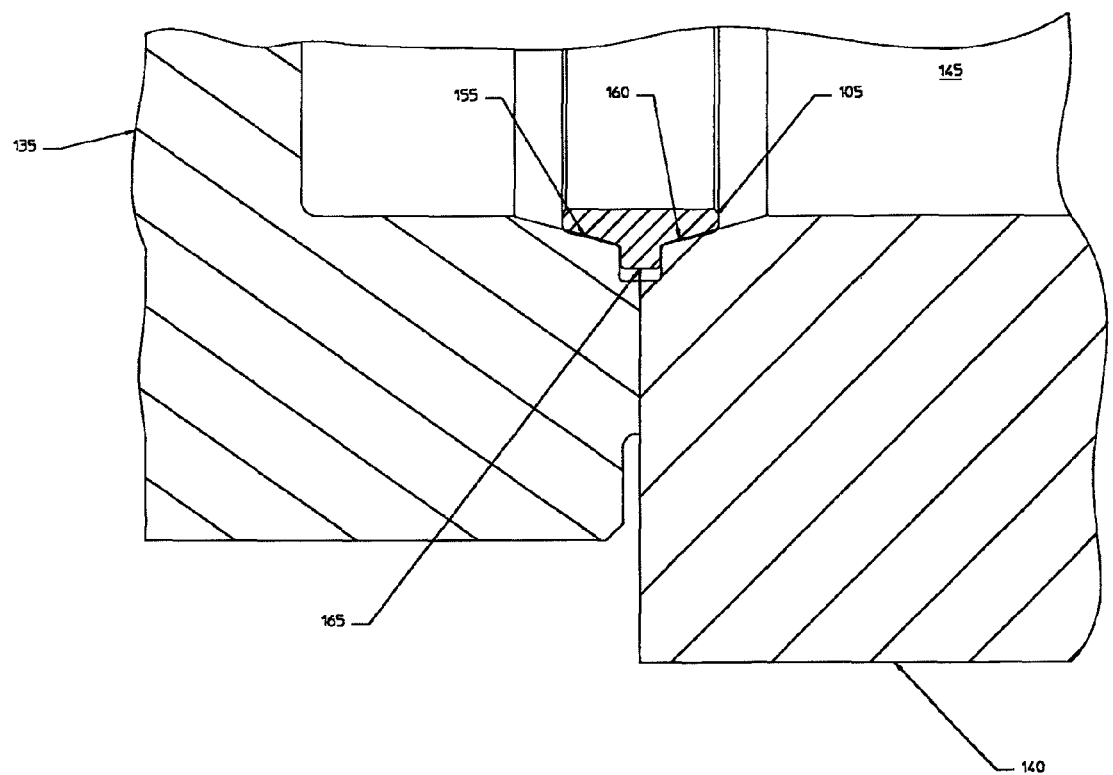
FIGS. 1B, 1C and 1D are detailed partial cross sectional views of conventional gaskets.

FIG. 1B shows a detailed partial cross sectional view of the conventional gasket 105. As depicted, the gasket 105 includes a central stabilization ring 165 and can seal the interface between the bonnet 135 and the valve body 140. Under suitable force, sealing surfaces 155 and 160 provide a single sealing barrier between the cavity 145 and the exterior environment of the gate valve 120. In typical well tree implementations, the cavity 145 may be in fluid communication with the well and, when no other valve in the fluid flow path (such as a down-hole safety valve or a sub-surface safety valve) is closed, the gasket 105 is the only barrier between the production fluid and the environment at the well head. Such implementations fail to provide redundant sealing barriers under such conditions.

Figure 1C:
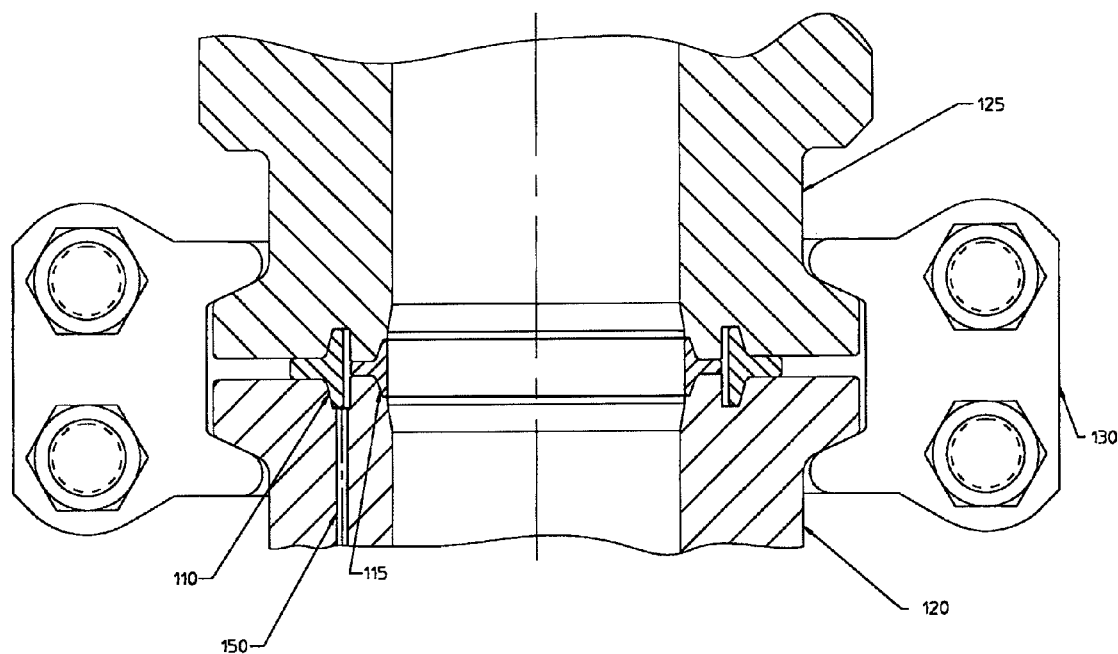

FIG. 1C shows a detailed partial cross sectional view of the conventional gaskets 110 and 115 in a dual barrier arrangement. The gasket 110 is the larger of the two gaskets, having a greater diameter and being arranged as the outer gasket. The gasket 115 is arranged as the inner gasket.

A channel 150 in the valve body typically extends from the cavity between the gaskets 110 and 115 to an external port. The channel 150 may allow monitoring and/or testing for possible leakage through the inner gasket 115. The channel 150 may also allow testing of the outer gasket 110.

As depicted, the gaskets 110 and 115 show the conventional method of providing redundant barriers located at the outlet interface of a gate valve. However, as should be apparent, the gaskets 110 and 115 fail to remedy the deficiencies of the single barrier provided by the gasket 105 inside the gate valve 120, at the interface between the bonnet 135 and the valve body 140. Moreover, this conventional method of providing redundant barriers has a number of disadvantages, including the requirement that two gaskets be provided and that a larger gasket be provided for the second barrier.

Another disadvantage is the much greater force necessary to retain the outer gasket due to the much greater area of containment, considering the larger diameter of gasket 115. A larger clamping arrangement 130 must provide the greater force to maintain the connection and seals despite the greater axial load. A single gasket, by contrast, requires less force to maintain the connection and a smaller clamping arrangement.

Figure 1D:
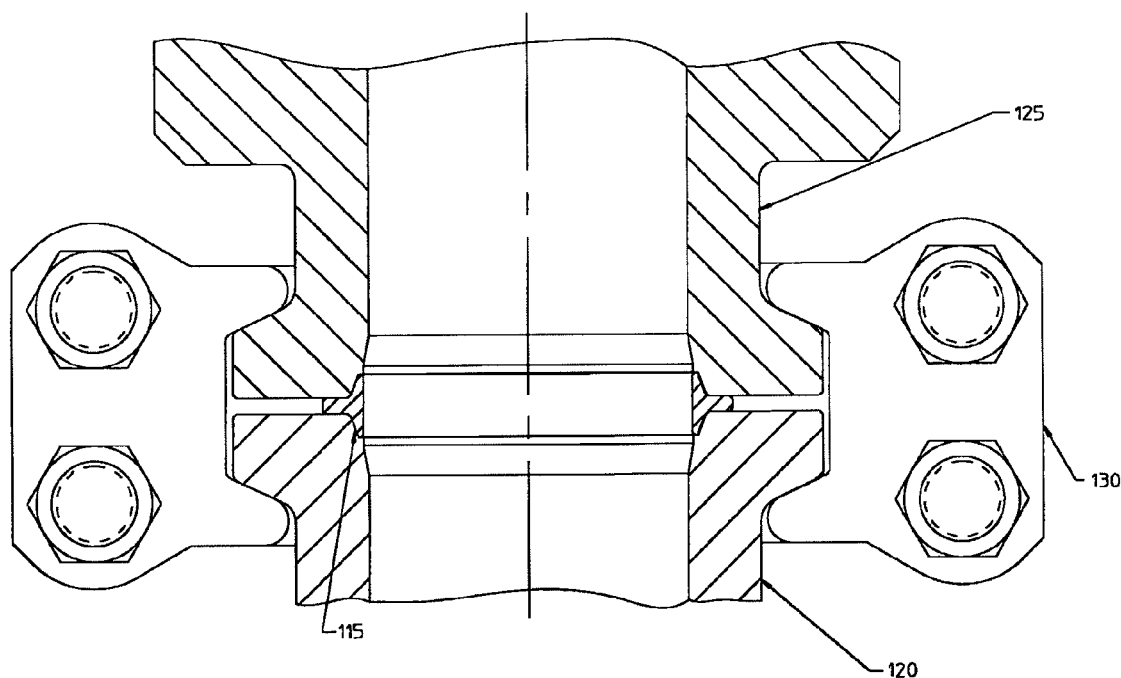

For example, referring again to FIG. 1A, the gate valve assembly 100 includes a conventional gasket 175 at the interface between the gate valve 120 and the end cap 180 that is arranged to provide a single sealing barrier. A clamping arrangement 185 is arranged to maintain the connection between the gate valve 120 and the end cap 180 by applying force to the flanges. As illustrated, the clamping arrangement 185 may be smaller than the clamping arrangement 130. As another example, FIG. 1D shows an example of how the clamping arrangement 130, and the interface between the gate valve 120 and the body 125, would be smaller without the gasket 110 and with only a single barrier provided by the gasket 115.

Figure 2A:
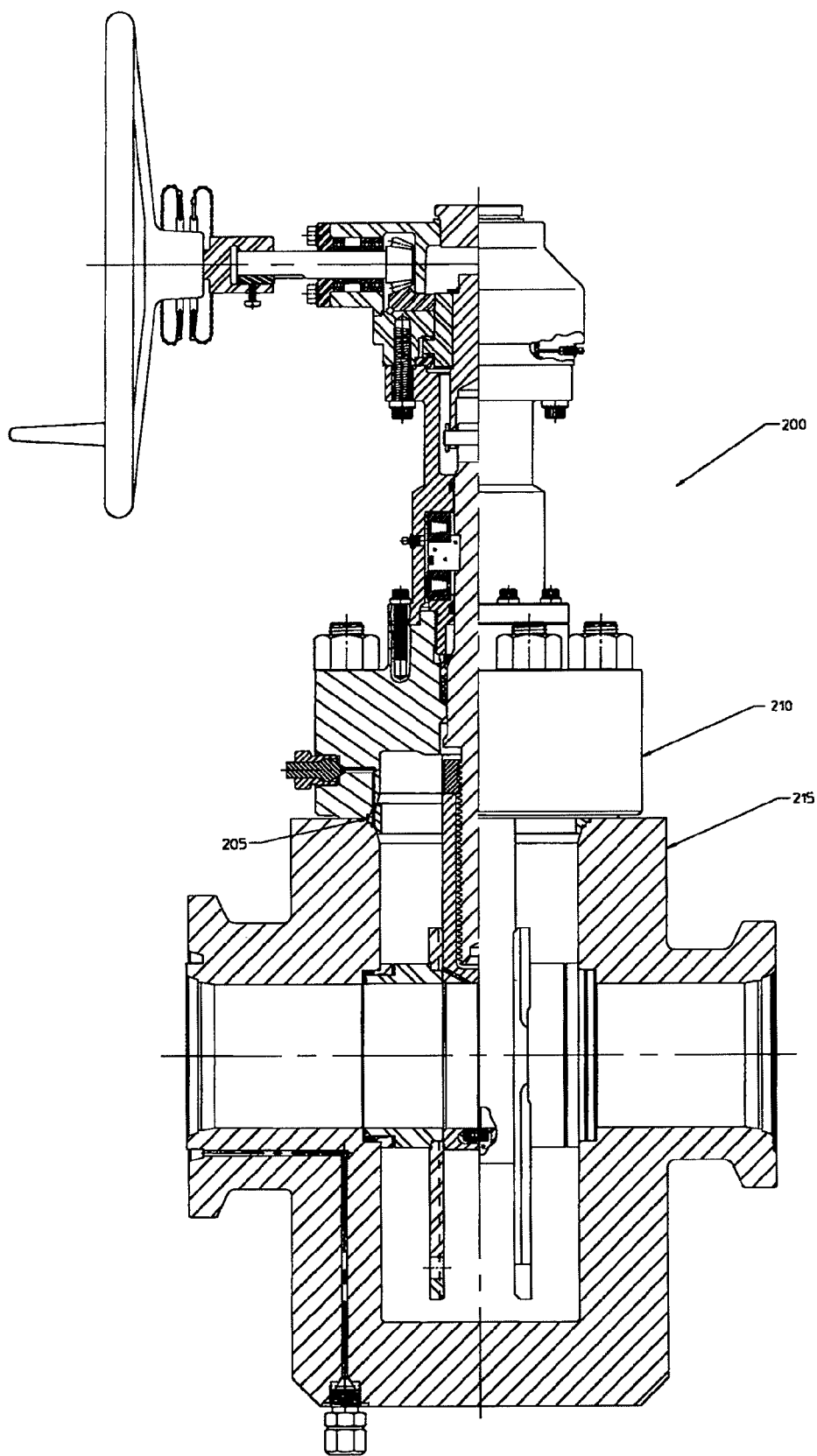
FIG. 2A is an overall partial cross sectional view of a gate valve with dual barrier gaskets at the bonnet flange and outlet flanges, in accordance with certain embodiments of the present disclosure.
Figure 2B:
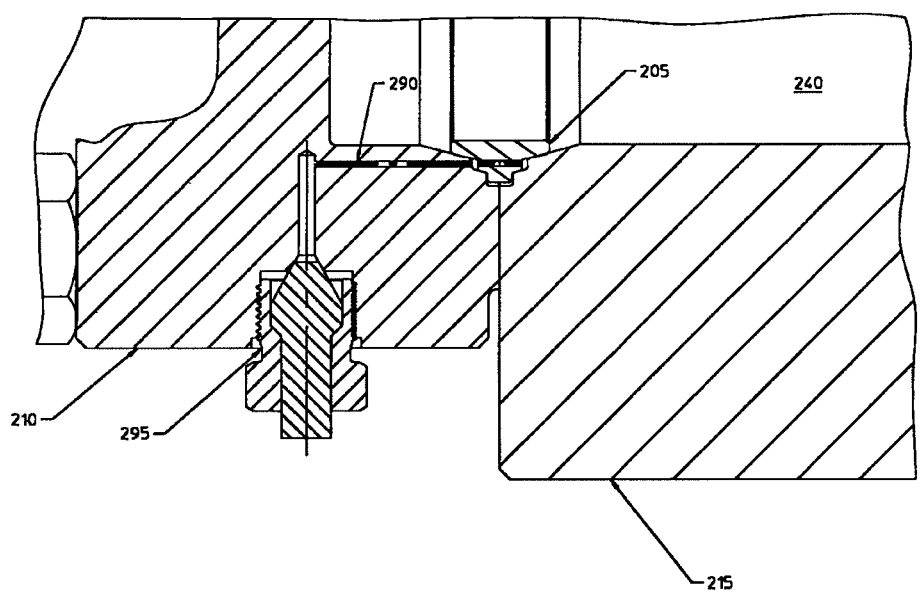
FIGS. 2B, 2C, 2D and 2E are detailed partial cross sectional views of a dual barrier gasket, in accordance with certain embodiments of the present disclosure.

FIGS. 2A and 2B show a gate valve 200 with a dual barrier gasket, in accordance with certain embodiments of the present disclosure. FIG. 2A is an overall cross sectional view of the gate valve 200 with a dual barrier gasket generally indicated at 205. The gasket 205 is located at the interface between the valve bonnet (or second body) 210 and the valve body (or first body) 215.

Figure 2C:
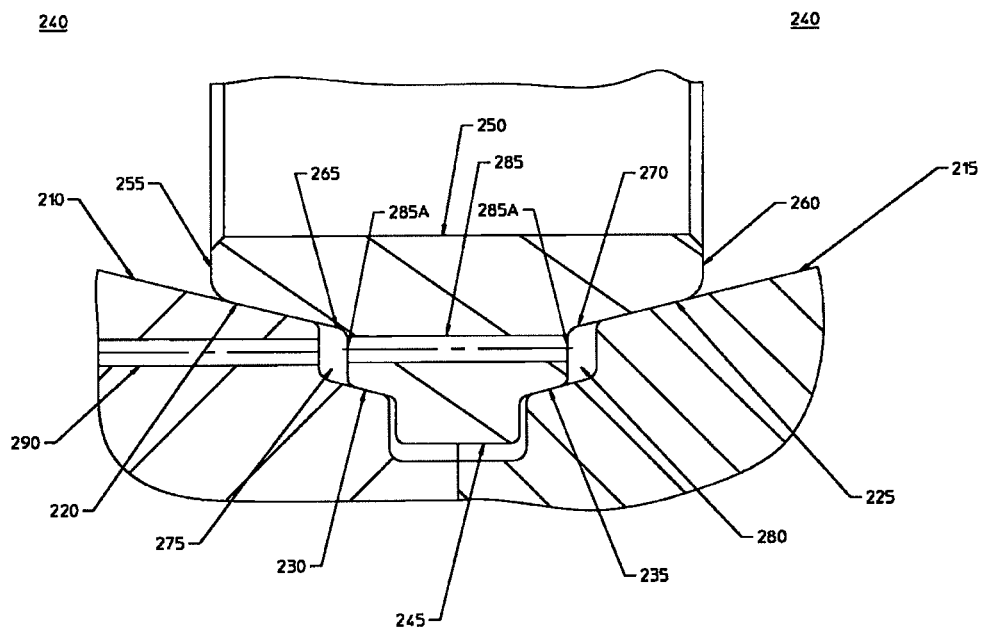

FIGS. 2B and 2C are detailed partial cross sectional views of the dual barrier gasket 205. One embodiment of the gasket 205 may be generally annular with a substantially cylindrical inner surface 250, and longitudinal ends 255 and 260 generally opposite one another. The gasket 205 includes a gasket outer surface 252, relative to the gasket's central axis and/or to the substantially cylindrical inner surface 250. The gasket outer surface 252 may include an approximate midpoint M1 between longitudinal ends 255 and 260.

As depicted, the gasket outer surface 252 may include a stabilization ring 245 extending from the gasket 205 and generally disposed between longitudinal ends 255 and 260. The stabilization ring 245 may be at an approximate midpoint M1 between longitudinal ends 255 and 260. The gasket outer surface 252 may include sealing surfaces 220, 225, 230 and 235. The sealing surface 220 may be between the midpoint M1 and the longitudinal end 255, and the sealing surface 230 may be between the sealing surface 220 and the midpoint M1.

In certain embodiments, the sealing surfaces 225 and 235 may mirror or substantially mirror the sealing surfaces 220 and 230 about the midpoint M1. The sealing surface 225 may be between the midpoint M1 and the longitudinal end 260, and the sealing surface 235 may be between the sealing surface 225 and the midpoint M1. One or both of the sealing surfaces 220 and 225 may include at least one portion disposed at a first distance D1 from the substantially cylindrical inner surface 250. One or both of the sealing surfaces 230 and 235 may include at least one portion disposed at a second distance D2 from the substantially cylindrical inner surface 250. As depicted, the sealing surfaces 230 and 235 may be disposed further away from the substantially cylindrical inner surface 250 than the sealing surfaces 220 and 225. Additionally, the sealing surfaces 220 and 230 may be disposed so that a tangential plane to at least a portion of the sealing surface 230 is radially offset from a tangential plane to at least a portion of the sealing surface 220, as is evident for example in FIGS. 2B, 2B, 2E and 3. Likewise, the sealing surfaces 225 and 235 may be disposed so that a tangential plane to at least a portion of the sealing surface 235 is radially offset from a tangential plane to at least a portion of the sealing surface 225.

Each of the sealing surfaces 220, 225, 230 and 235 may allow a seal to form between the gasket 205 and corresponding sealing surfaces on components, such as the bonnet 210 and the valve body 215. The sealing surfaces 220 and 225 may together form an inner sealing barrier, while the sealing surfaces 230 and 235 may together form an outer sealing barrier (i.e., "inner" and "outer" with respect to the gasket's central axis and/or the substantially cylindrical inner surface 250).

The stabilization ring 245 may be a central stabilization ring that helps to stiffen the gasket 205 with its large outer diameter. In alternative embodiments not shown, the gasket 205 may be designed such that the stabilization ring 245 is offset slightly, or such that the stabilization ring 245 is not present and/or the gasket 205 and/or may be flush with the seating area of the components, depending on the particular design of the seating profile.

A first transition 265 may be included between the sealing surfaces 220 and 230. A second transition 270 may be included between the sealing surfaces 225 and 235. The transitions 265 and 270 may include radial surfaces and/or surfaces extending substantially radially outward toward the sealing surfaces 230 and 235. In certain embodiments, the transitions 265 and 270 may form recessed surfaces from their respective sealing surfaces. The transitions 265 and 270 may form, in conjunction with the bonnet 210 and valve body 215 cavities 275 and 280. In additional alternative embodiments not shown, the gasket seating area in the valve body 215 and/or the valve bonnet 210 may include a single continuous surface or a single continuous surface with a port in the face of the surface, as opposed to the varying surfaces depicted. For example, in such embodiments, the gasket 205 may similarly have sealing surfaces similar to the sealing surfaces 220 and 230, for example, with a recess similar to the first transition 265 in between the sealing surfaces.

The gasket 205 is configured to seal the interface between the bonnet 210 and the valve body 215 to prevent fluid communication between the cavity 240 of the interior of the gate valve 200 and the exterior of the gate valve 200. Under suitable force, such as when the bolting is sufficiently tightened, sealing surfaces 220 and 225 provide a first sealing barrier between the cavity 240 and the exterior environment of the gate valve 200, and the sealing surfaces 230 and 235 provide a second sealing barrier. Thus, in typical well tree implementations, where the cavity 240 may be in fluid communication with the well, two sealing barriers are provided between the production fluid and the environment at the well head regardless of the state of any down-hole or sub-surface safety valves.

The gasket 205 may include a gasket channel 285 with ports 285A and 285B configured to provide a pathway between the cavities 275 and 280 so that each side of the gasket 205 (e.g., the side generally facing the bonnet 210 and the side generally facing the valve body 215) may be monitored and/or tested for leakage, in conjunction with a channel 290 in one of the mating components. The channel 290 may extend through the bonnet 210, as depicted, or through another component. The channel 290 may extend from the cavities 275 and 280 to an external port 295 (depicted as plugged) in order to allow monitoring and/or testing for possible leakage through the gasket 205. Thus, with a single channel 290 between the exterior of the valve 200 and the gasket 205, both sides of the gasket 205 may be monitored and/or tested. Additionally, the gasket channel 285 may allow for the pressurization of the cavity 280 through the single channel 290 and cavity 275 so that the sealing surfaces 220 and 225 and/or sealing surfaces 230 and 235 may be tested. For example, the gate valve cavity 240 and the cavities 275 and 280 may be pressurized to a test pressure to allow for testing of the sealing surfaces 230 and 235. The gasket channel 285 may be omitted if two channels 290, one on either side of the gasket 250, are used (this is not shown).

As depicted, the gasket 205 may be configured to seal on a gasket seat profile tapered at a non-perpendicular angle from the interface, such that which is typical for many existing gasket seat profiles. In alternative embodiments, the gasket 205 may be perpendicular to the interface, such as with a straight bore, tapered at any other suitable angles, or combinations thereof. FIG. 2E, for example, shows an example of the gasket 205 corresponding to that of FIGS. 2B and 2C, but configured to seal on a gasket seat profile of a straight bore.

Figure 2D:
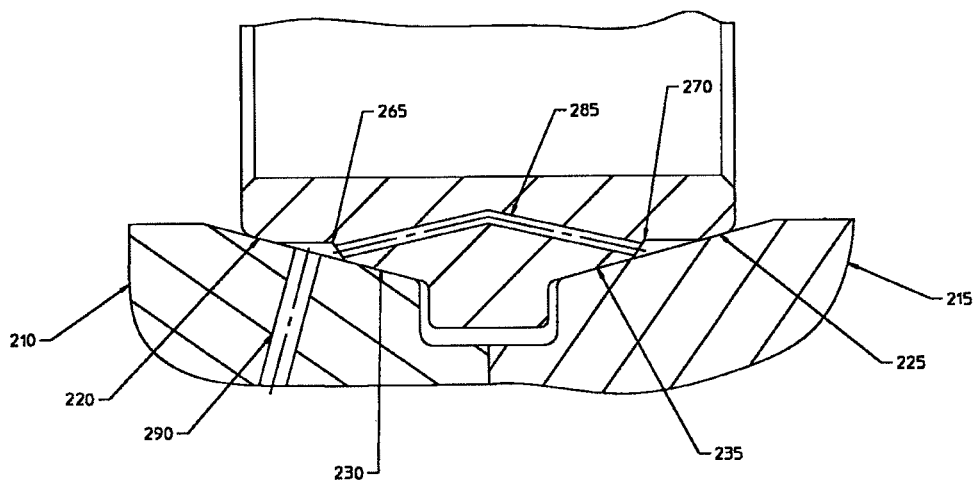
Figure 2E:
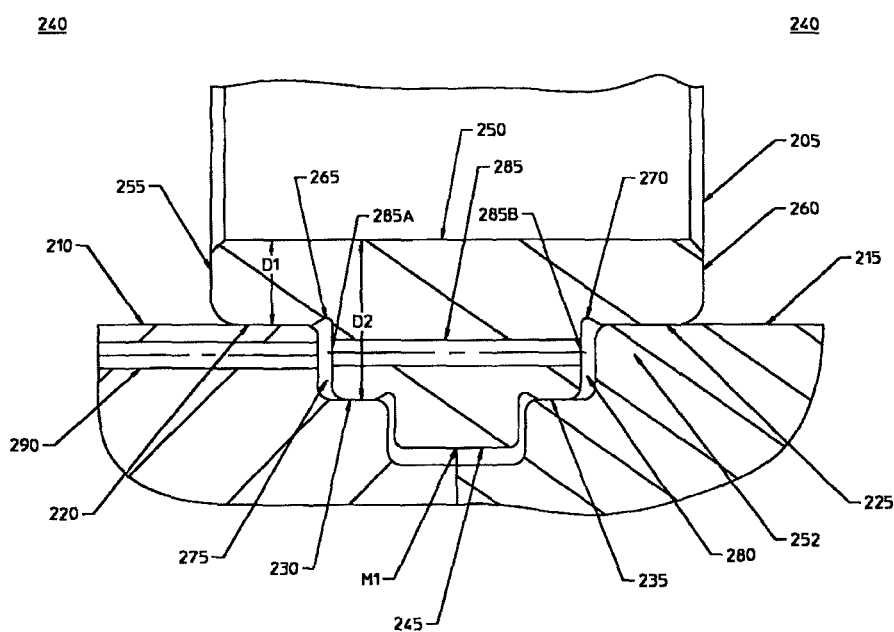

FIG. 2D is a detailed partial cross sectional view of a dual barrier gasket 205, in accordance with another embodiment of the present disclosure. As depicted, the sealing surfaces 220, 225, 230 and 235 may be configured to seal on a gasket seat profile where the bonnet 210 provides a single continuous surface and the valve body 215 provides a single continuous surface. The transitions 265 and 270 may include recesses, and the gasket channel 285 may have the angled form shown, a straight form, or any suitable form. The channel 290 may extend through one of the mating components in the orientation depicted, or any other suitable orientation.

Figure 3:
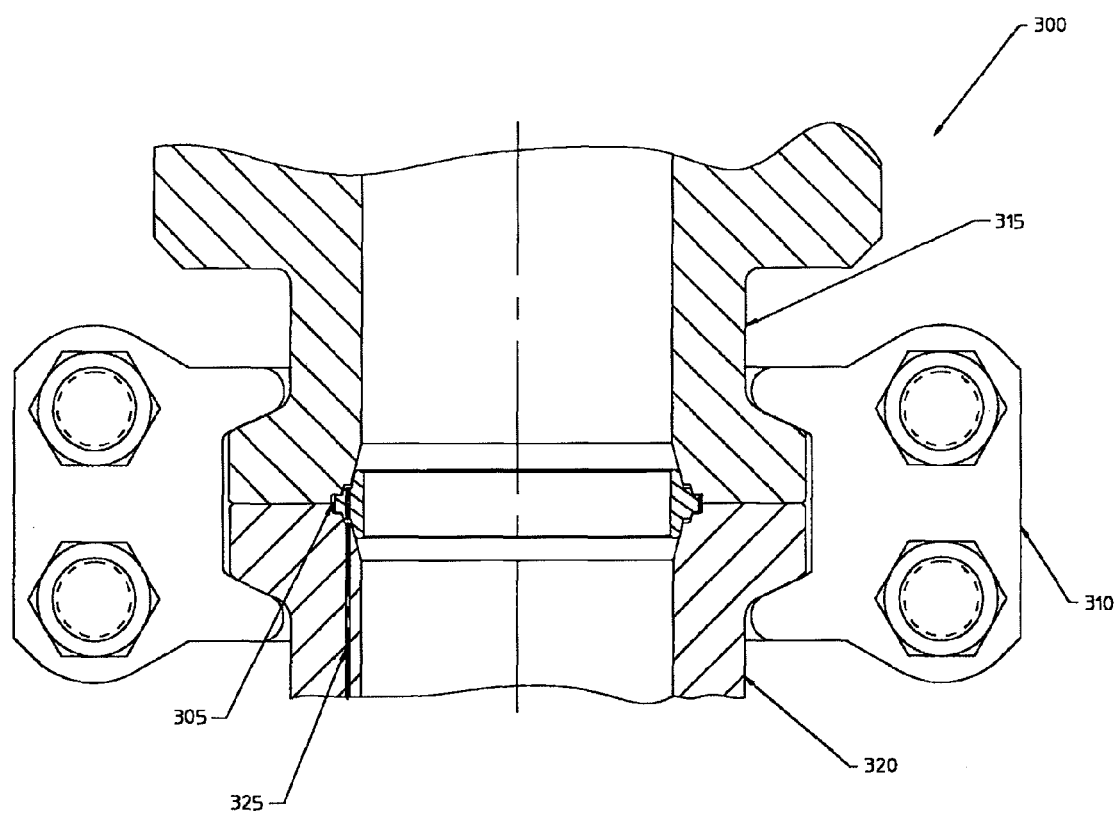
FIG. 3 is a detailed partial cross sectional view of a dual barrier gasket, in accordance with certain embodiments of the present disclosure.

FIG. 3 shows a tubular assembly 300 with a dual barrier gasket 305 and a clamping arrangement 310, in accordance with certain embodiments of the present disclosure. The gasket 305 is located at the interface between a first body 315 and a second body 320, and may be similar to the gasket 205. A channel 325 may extend through one or both of the first body 315 and the second body 320. As compared to conventional gasket approaches, the gasket 305 may provide the advantage of requiring less retaining force via the clamping arrangement 310 due to the smaller area of containment and the smaller diameter of the gasket 305.

Certain embodiments of the present disclosure may be designed for use with lower master gate valves used in production tree applications. Certain embodiments may provide a dual barrier with independent sealing surfaces and porting to allow for the independent testing of the gasket seal areas. While embodiments of the gasket 205 are disclosed herein for implementation at a bonnet-valve body interface which may be used in with a well tree assembly, certain embodiments may be used for other implementations. For example, certain embodiments may be implemented with an interface between a valve body and a tubular, an interface involving a non-valve product, such as wellhead-to-flange, wellhead-to-wellhead, flange-to-flange, or connector-to-connector interfaces. The gasket 205 may be made from any of a number of different materials suitable for use in a subsea application. For example, the gasket 205 may be plastic or metal. More specifically, the gasket 205 may be stainless steel, alloy steel, titanium, nickel based alloy, or any other material resistant to both rusting and melting in a subsea environment. The sealing surfaces of the gasket may be made of a soft metal, plastic or an elastomer with the gasket made of a different material. The material of the gasket 205 may be coated or left uncoated. The gasket 205 may have an inner diameter of up to about 16" or within a range of about 2" to 15." In addition to the popular size ranges listed, the gasket 205 may be sized to fit any number of applications.

Accordingly, embodiments of the present disclosure may allow for two barriers in a number of applications where a dual barrier seal is required. With a well tree application, certain embodiments may allow for two barriers between a well bore and the outside environment when fluid is flowing in the well tree. Certain embodiments may allow for the conversion of existing equipment with a two-gasket implementation to a dual barrier gasket, while maintaining the existing bolting and valve body size. Additionally, embodiments may allow for a dual barrier gasket without significantly increasing the diameter of the outer sealing surface, thereby allowing the connection size and the required bolting size to be minimized due to the decreased load required to maintain the seals. These and other technical advantages will be apparent to those of ordinary skill in the art in view of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. An assembly comprising a dual barrier gasket located at an interface between a first body and a second body, the dual barrier gasket comprising:
    a substantially cylindrical inner surface; and
    a gasket outer surface that is configured to provide an inner sealing barrier and an outer sealing barrier;
    wherein the inner sealing barrier comprises a first radially outer surface and a second radially outer surface and the outer sealing barrier comprises a first radially inner surface and a second radially inner surface, and wherein each of the first and second radially outer and radially inner surfaces are conical;
    wherein the first radially inner surface and the first radially outer surface contact the first body and the second radially inner surface and the second radially outer surface contact the second body;
    wherein the first radially inner surface and the second radially inner surface are radially and axially offset from the first radially outer surface and the second radially outer surface;
    wherein a first tangent plane to a portion of the outer sealing barrier is completely radially offset from a second tangent plane to a portion of the inner sealing barrier; and
    wherein the gasket outer surface comprises a first port and a second port, wherein a first channel extends from the first port through the dual barrier gasket to the second port; and
    the assembly further comprising at least one of either a second channel or a third channel;
    wherein the second channel is disposed within the first body and the third channel is disposed within the second body;
    wherein the second channel extends from a cavity between the inner sealing barrier and the outer sealing barrier of the dual barrier gasket and the first body to a first external port;
    wherein the third channel extends from a cavity between the inner sealing barrier and the outer sealing barrier of the dual barrier gasket and the second body to a second external port;
    wherein either one of the second channel or the third channel is operable to test both the inner sealing barrier and the outer sealing barrier of the dual barrier gasket;
    wherein the portion of the first body that contacts the first radially outer surface of the gasket is a conical radially outer surface which corresponds to the first radially outer surface, the portion of the first body that contacts the first radially inner surface of the gasket is a conical radially inner surface which corresponds to the first radially inner surface, and wherein an axial surface directly connects the conical radially outer surface with the conical radially inner surface of the first member; and
    wherein the portion of the second body that contacts the second radially outer surface of the gasket is a conical radially outer surface which corresponds to the second radially outer surface, the portion of the second body that contacts the second radially inner surface of the gasket is a conical radially inner surface which corresponds to the second radially inner surface, and wherein an axial surface directly connects the conical radially outer surface with the conical radially inner surface of the second member.

2. The assembly of claim 1, wherein one or both of the inner sealing barrier and the outer sealing barrier is configured to seal tapered surfaces.

3. The assembly of claim 1, wherein the gasket outer surface comprises a stabilization ring comprising an outermost radial surface.

4. An assembly comprising a dual barrier gasket located at an interface between a first body and a second body, the dual barrier gasket comprising:
    a substantially cylindrical inner surface;
    a gasket outer surface that is generally opposite the substantially cylindrical inner surface and comprises a midpoint;
    a first longitudinal end abutting the substantially cylindrical inner surface;
    a second longitudinal end abutting the substantially cylindrical inner surface and generally opposite the first longitudinal end;
    a first sealing surface between the first longitudinal end and the midpoint; and
    a second sealing surface between the first sealing surface and the midpoint;
    wherein the first sealing surface comprises a first radially outer surface and a second radially outer surface and the second sealing surface comprises a first radially inner surface and a second radially inner surface, and wherein each of the first and second radially outer and radially inner surfaces are conical;
wherein the first radially inner surface and the first radially outer surface contact the first body and the second radially inner surface and the second radially outer surface contact the second body;
wherein the first radially inner surface and the second radially inner surface are radially and axially offset from the first radially outer surface and the second radially outer surface;
wherein a first tangent plane to a portion of the second sealing surface is completely radially offset from a second tangent plane to a portion of the first sealing surface;
the assembly further comprising at least one of either a first channel or a second channel;
wherein the first channel is disposed within the first body and the second channel is disposed within the second body;
wherein the first channel extends from a cavity between the first sealing surface and the second sealing surface of the dual barrier gasket and the first body to a first external port;
wherein the second channel extends from a cavity between the first sealing surface and the second sealing surface of the dual barrier gasket and the second body to a second external port;
wherein either one of the first channel or the second channel is operable to test both the first sealing surface and the second sealing surface of the dual barrier gasket;
wherein the portion of the first body that contacts the first radially outer surface of the gasket is a conical radially outer surface which corresponds to the first radially outer surface, the portion of the first body that contacts the first radially inner surface of the gasket is a conical radially inner surface which corresponds to the first radially inner surface, and wherein an axial surface directly connects the conical radially outer surface with the conical radially inner surface of the first member; and
wherein the portion of the second body that contacts the second radially outer surface of the gasket is a conical radially outer surface which corresponds to the second radially outer surface, the portion of the second body that contacts the second radially inner surface of the gasket is a conical radially inner surface which corresponds to the second radially inner surface, and wherein an axial surface directly connects the conical radially outer surface with the conical radially inner surface of the second member.

5. The assembly of claim 4, wherein the second sealing surface is further from the substantially cylindrical inner surface than the first sealing surface.

6. The assembly of claim 4, wherein the gasket outer surface comprises a first port and a second port, and wherein a third channel extends from the first port through the dual barrier gasket to second port.

7. The dual barrier gasket of claim 4, wherein one or both of the first sealing surface and the second sealing surface is configured to seal tapered surfaces.

8. The assembly of claim 4, wherein the gasket outer surface comprises a stabilization ring comprising an outermost radial surface.

9. An assembly configured to be sealed with a dual barrier gasket, the assembly comprising:
a first body;
a second body; and
a dual barrier gasket configured to seal an interface between the first body and the second body, the dual barrier gasket comprising:
a substantially cylindrical inner surface; and
a gasket outer surface that is configured to provide an inner sealing barrier and an outer sealing barrier;
wherein the inner sealing barrier comprises a first radially outer surface and a second radially outer surface and the outer sealing barrier comprises a first radially inner surface and a second radially inner surface, and wherein each of the first and second radially outer and radially inner surfaces are conical;
wherein the first radially inner surface and the first radially outer surface contact the first body and the second radially inner surface and the second radially outer surface contact the second body;
wherein the first radially inner surface and the second radially inner surface are radially and axially offset from the first radially outer surface and the second radially outer surface;
wherein a first tangent plane to a portion of the outer sealing barrier is completely radially offset from a second tangent plane to a portion of the inner sealing barrier;
the assembly further comprising at least one of either a first channel or a second channel;
wherein the first channel is disposed within the first body and the second channel is disposed within the second body;
wherein the first channel extends from a cavity between the inner sealing barrier and the outer sealing barrier of the dual barrier gasket and the first body to a first external port;
wherein the second channel extends from a cavity between the inner sealing barrier and the outer sealing barrier of the dual barrier gasket and the second body to a second external port; and
wherein either one of the first channel or the second channel is operable to test both the inner sealing barrier and the outer sealing barrier of the dual barrier gasket;
wherein the portion of the first body that contacts the first radially outer surface of the gasket is a conical radially outer surface which corresponds to the first radially outer surface, the portion of the first body that contacts the first radially inner surface of the gasket is a conical radially inner surface which corresponds to the first radially inner surface, and wherein an axial surface directly connects the conical radially outer surface with the conical radially inner surface of the first member; and
wherein the portion of the second body that contacts the second radially outer surface of the gasket is a conical radially outer surface which corresponds to the second radially outer surface, the portion of the second body that contacts the second radially inner surface of the gasket is a conical radially inner surface which corresponds to the second radially inner surface, and wherein an axial surface directly connects the conical radially outer surface with the conical radially inner surface of the second member.

10. The assembly of claim 9, wherein the gasket outer surface and the second body define a first cavity, wherein the gasket outer surface and the first body define a second cavity, and wherein the dual barrier gasket comprises a third channel extending therethrough and connecting the first cavity and the second cavity.

11. The assembly of claim 9, wherein one or both of the inner sealing barrier and the outer sealing barrier is configured to seal tapered surfaces.

12. The assembly of claim 9, wherein the gasket outer surface comprises a stabilization ring comprising an outermost radial surface.

* * * * *